Figure 1:
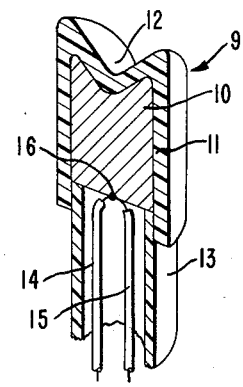

Dec. 11, 1962   R. P. BIGLIANO ETAL   3,068,409
CAPACITIVE POWER LINE VOLTMETER
Filed Jan. 29, 1959

INVENTORS
ROBERT P. BIGLIANO
FREDERICK F. WHITE, JR.
BY  Harry J. McCauley
ATTORNEY

United States Patent Office 3,068,409
Patented Dec. 11, 1962

3,068,409
CAPACITIVE POWER LINE VOLTMETER
Robert P. Bigliano, Wilmington, and Frederick F. White, Jr., Greenville, Del., assignors to E. I. du Pont de Nemours and Company, Wilmington, Del., a corporation of Delaware
Filed Jan. 29, 1959, Ser. No. 789,905
6 Claims. (Cl. 324—111)

This invention relates to a capacitive type power line voltmeter, and particularly to a voltmeter which is adapted to ascertain the potential existing in an A.C. power line regardless of whether the power line is insulated or uninsulated or whether electrical current is flowing therethrough or not.

It is often necessary in the course of electrical maintenance to determine the existing electrical potential in an alternating current power line preparatory to all other operations, both in the interests of safety and as an aid in the selection of proper work procedures dependent on the potential condition of the line. It is ordinarily not necessary that the potential be ascertained with any extreme accuracy and it is usually desired to know only the general potential range involved, such as one of the voltage standards of approximately 110–115, 220, 550, 1100, 2300, or 12,000. Conversely, if the power line is "dead" it is imperative that this be determined with full safety to the maintenance personnel. A complicating factor is that power lines are commonly encountered in a very wide variety of wire gage sizes and, also, either bare or covered with various thicknesses of insulation. Desirably, the voltage determinations should be substantially independent of wire size, the presence or absence of insulation, or like factors, so that no measurements of these characteristic features will be required, both from the standpoint of safety and also of protection of the power line from damage. Capacitive type voltmeters per se are known to the art, one such design, intended exclusively for high frequency service being taught in U.S.P. 2,412,191; however, these require electrical connection to the power line, the adjustment of variable capacitances in the potential measuring circuit, or other manipulations which are objectionable from the standpoint of personnel safety.

Figure 2:
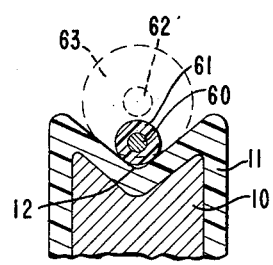
Figure 3:
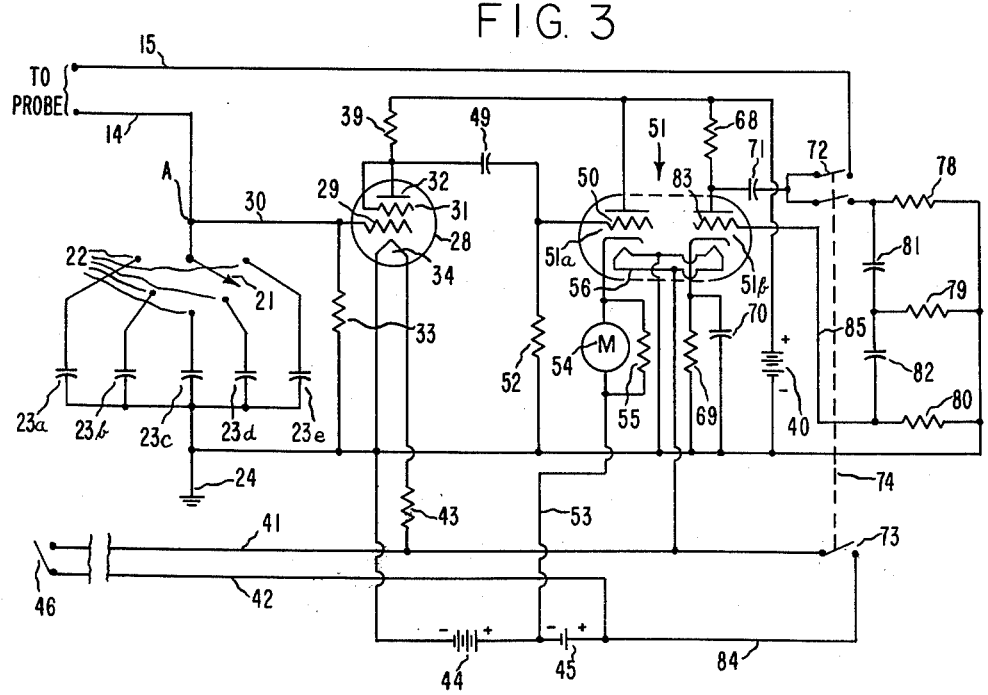

A primary object of this invention is to provide a capacitive type power line voltmeter for use on power lines carrying frequencies of about 25 to about 1000 c.p.s. which does not require electrical connection with the power line and which is completely safe in its operation. Other objects of this invention are to provide a power line voltmeter which is versatile and which, therefore, can be used for the measurement of a relatively wide number of voltages, and which is substantially independent in operation of wire gage size and insulation thickness. A further object is to provide a power line voltmeter which can be fitted with a testing auxiliary adapted to test the integrity of the testing circuitry per se, so that the user is assured that the instrument is in good operating order at all times. The manner in which these and other objects of this invention are attained will become apparent from the following detailed description and the drawings, in which:

FIG. 1 is a perspective view in cross section of a preferred embodiment of measuring probe according to this invention, FIG. 2 is a partially schematic representation of the probe of FIG. 1 in testing position with respect to two different sizes of insulated power line, the potentials of which are to be measured, and FIG. 3 is a diagrammatic representation of an electrical circuit of a preferred embodiment of apparatus according to this invention incorporating five capacitors of different value and provided with an integral oscillator for checking the integrity of the apparatus.

Generally, the voltmeter of this invention comprises an electrically insulated probe provided with an electrically insulated electrode adapted to contact the outside periphery of a power line without damage to any insulation thereon and without necessity for electrical metal-to-metal connection therewith, the electrode being connected in series electrical circuit through a capacitor to ground, a high impedance voltage detector in shunt connection with respect to the capacitor to ground, and means in electrical circuit with the output of the voltage detector for measuring the potential existing in the power line as a function of the output of the voltage detector.

Referring to FIG. 1, the probe indicated generally at 9 consists of a cylindrical aluminum electrode 10 about 1½" in diameter and 2–3" long covered completely over the exposed outside with a layer of high-test electrical insulation 11, such as polyethylene or the like, which is free of pits or holes and possessed of an electrical breakdown insulating characteristic well in excess of the maximum power line voltage to be measured, such as at least 20,000 volts for a measured level of 12,000 volts, as an example. A polyethylene coating of insulation 11 about 0.060" thick is satisfactory for measurements of power line voltage up to, and including, 12,000 volts. Typically, polyethylene has a measured electrical breakdown potential of approximately 700 volts/mil, thereby insuring a liberal safety factor in the thickness of 60 mils for 12,000 volts maximum measurement.

The upper end of electrode 10 is provided with a centrally disposed V notch 12 having an included angle of about 90° which is, of course, covered on the outside with a conforming layer of insulation of the same general thickness as the rest of insulation 11, which provides a convenient seat for the abutment of the power line against the probe when a voltage measurement is made.

The probe is mounted securely on the end of a hollow handle 13 by a cemented or screw type connection, not detailed, which handle is fabricated from material of high electrical insulation value, such as hard rubber, a phenol formaldehyde resin or the like, and is sufficiently long so that the operator is not required to come into proximity with the power line, thus avoiding electrocution by arc-over or possible accidental contact with the line. The testing circuit with electrode 10 is made through two heavily insulated wires 14 and 15 which are securely bonded in electrical connection with electrode 10 at 16, which may be a securely welded or brazed joint with the bare metal from which the insulation has been locally stripped.

Referring to FIG. 3, conductors 14 and 15 terminating in electrode 10 are connected in the test circuit as hereinafter described in detail. Conductor 14 is connected to switch arm 21 which is adapted to complete an electrical circuit to ground through preselected capacitors 23a–23e at the operator's choice by shifting to one of the five switch contacts 22, as a typical embodiment. The remaining plates of capacitors 23a–23e are connected to electrical ground 24, which may be an iron rod or the like which is driven deep into the ground. Alternatively, the ground can be a screw or spring-biased clamp adapted for connection with the pipes of an underground water supply system or other well-grounded facility, or to an existing ground wire, such as those normally provided at electrical power sub-stations or at the bases of power line supporting structures. In the construction detailed, the respective capacitances of 23a–23e are 0.0004 μfd., 0.0008 μfd., 0.002 μfd., 0.008 μfd., and 0.09 μfd., this array being particularly adapted to the measurement of 60 cycle alternating current voltages within the ranges of 0–125 v., 0–250 v., 550 v., 2200 v., and 12,000 v., respectively.

It will be understood that insulated probe 9 when placed against the power line to be tested constitutes, with the power line, one capacitance of a pair. This capacitance is composed of electrode 10 as one electrode, the power line as the other electrode, and the thickness of insulation 11 of probe 9, plus intervening air and any insulation sheathing the power line, as the dielectric. A selected one of the capacitors 23a–23e constitutes the other capacitance in series circuit to ground, thereby providing a capacitive voltage divider from the power line to ground. As is well known in the art, the power line to ground voltage, if any, will be distributed in inverse relationship to the capacitance values of the two capacitors in the series circuit to ground; however, any measurement of voltage must be made while drawing substantially zero electrical current. The reason for this is that the current which can be passed through the very small capacitance of the probe-power line capacitor is very small, e.g., of the order of about 10 $\mu$a., and any appreciable withdrawal of current by the apparatus would alter the strict inverse distribution of voltage hereinbefore mentioned and result in inaccuracies in the determination.

Accordingly, the voltage existing between the capacitors of the divider is measured by a high impedance voltage detector, such as electrometer tube 28 (input impedance in the range of $10^{12}$–$10^{13}$ ohms), the grid 29 of which is tapped to conductor 14 at point A by a short shielded lead 30. As shown, electrometer tube 28 may conveniently be a filamentary cathode tube, such as a tetrode type CK–5886, the screen grid 31 of which is tied to plate 32. To insure against a "floating grid," grid leak 33 of 100 megohms value is provided to ground 24, which ground is also connected to cathode 34. Grid leak 33 determines the impedance of the electrometer at substantially 100 megohms, which is at least ten times the highest impedance contributed by any one of the individual capacitors 23a–23e, so that negligible current is drawn by grid 29.

The power supply for electrometer tube 28 is derived from two separate sources, one of which is D.-C. source 40, which may conveniently be a 90 v. "B" battery, the positive side of which is connected to plate 32 through resistor 39 of 0.47 megohm value, while the negative side is connected to ground. Cathode 34 is supplied with D.-C. power from source 44—45 connected in circuit through leads 41 and 42, single pole, single throw switch 46 and dropping resistor 43, which typically has a resistance of 470 ohms. Source 44 may conveniently consist of three 1.5 v. flashlight batteries connected in series, whereas source 45 is a single 1.5 v. flashlight battery. Switch 46 is preferably disposed near the end of probe handle 13 remote from probe 9, and within convenient thumb reach of the operator, who is thus enabled to switch the apparatus on with one finger while retaining free use of his other body members for his support.

Plate 32 of electrometer 28 is capacitor-coupled to grid 50 of triode section 51a of double triode tube 51, which may be a type CK–6112 tube, through capacitor 49 (capacitance 0.1 $\mu$fd.), 50 being provided with a grid leak 52 of 0.5 megohm resistance connected to ground 24. The plate of triode section 51a is connected to the positive side of D.-C. source 40, while the cathode is returned through microammeter 54 (range 0–500 $\mu$a.), provided with 50 ohm meter shunt 55, to lead 53, which is tapped between sources 44 and 45. By this tap, the voltage of source 44 provides necessary negative bias for grid 50. The cathode of triode section 51a is heated by the common filament 56 serving both triode sections, which is connected between lead 41 and ground 24 in the same manner as cathode 34.

The foregoing description is complete as to a workable instrument, exclusive of a testing auxiliary, the triode section 51b of tube 51 being reserved for operation as an oscillator where a built-in testing auxiliary is desired, as is preferred.

In operation, the apparatus is first warmed up by closing switch 46 and allowing a minute or two to elapse before making a measurement. Probe 9 is then brought into snug contact with the outside of the power line as is indicated in FIG. 2. One size of power line conductor 60, provided with its insulative jacket 61, is shown in full line representation in this figure, while a second power line conductor 62, with its insulative jacket 63, is shown in broken line representation to illustrate the relative dispositions existing for two typical situations. In both cases, it will be noted that the power line is disposed symmetrically with respect to the two faces of V notch 12, which contributes to accuracy of measurement and, at the same time, minimizes the disproportionate effects of different wire gage sizes and different insulation thicknesses.

Regardless of whether the conductors 60 or 62 are bare or insulated, a characteristic A.-C. voltage will appear at point A, to which lead 30 of electrometer tube 28 is connected, when one of capacitors 23a–23e is connected in series to ground with A through switch arm 21 and one of the contacts 22. Voltage amplification is accomplished by electrometer tube 28 and the A.-C. voltage output is capacitor-coupled through 49 to grid 50 of triode section 51a, which serves as the power amplification and rectification stage. The D.-C. current flow from plate to cathode of triode 51a is modulated by the impressed grid voltage to yield an average value which is a function of the signal voltage applied to grid 29 of electrometer 28. This average current is indicated by microammeter 54. The grid bias of triode 51a, supplied by returning the cathode to ground through source 44, is preselected so that the triode is biased to approximate cut-off at zero signal voltage, whereupon plate-to-cathode current flows only when positive pulses of applied signal voltage derived from electrometer tube 28 reduce this bias. Accordingly, rectification and power amplification occur simultaneously in triode 51a.

Power line voltage readings are obtained by merely holding probe 9 steadily against the power line under evaluation and observing the reading of meter 54 as switch arm 21 is moved clockwise as seen in FIG. 3 in sequence over contacts 22 to thereby place individual capacitors 23e to 23e, respectively, in the order recited in the circuit. When the observed meter current falls within the range 350 to 500 $\mu$a. for the specific current meter hereinbefore described, the calibration voltage for the specific capacitor 23a–23e then connected in circuit is taken as the existing power line voltage.

From the foregoing, it will be understood that the sequential switching into circuit of the individual capacitors 23e–23a constitutes effecting such a division of the applied power line voltage that there is obtained an electrical potential at point A for any one of the five power line voltage magnitudes of interest which corresponds to a meter current within the arbitrarily selected range of 350–500 $\mu$a. This method of operation, utilizing a plurality of individual capacitors of different value, is preferred, in that nonlinearities in the voltage detection circuit, or drift effects which could introduce error at low current levels, are both minimized. However, if the latter considerations can be disregarded in a particular installation, the voltmeter of this invention can equally well utilize a single fixed capacitor in conjunction with a current meter of such wide range that the magnitude of the sensed potential at point A constitutes a measure of the existing power line voltage, and such a design is yet another embodiment of our invention.

It will be appreciated by persons skilled in the art that distributed capacities of unknown but significant magnitude exist between wires, cable shields, an instrument case, and the various internal components of an apparatus such as that hereinbefore described, which render it difficult or impossible to calculate the precise voltage division which will exist between the probe-to-power line capacitance and one of the meter capacitors 23a–23e. Accordingly, it is preferred to select capacitors 23a–23e as a final step in apparatus assembly by a cut-and-try method during actual trials with the probe in position against simulated power lines maintained at the particular voltages of interest. In the typical apparatus hereinbefore described, the particular capacitors 23a–23e employed were found suitable for use in conjunction with an instrument housed in an aluminum case measuring approximately 6″ x 6″ x 3″, which was provided with a probe handle 34″ long and with about 3 ft. of interconnecting cable. With a different assembly, capacitors 23a–23e might well have considerably different capacitance values than those detailed.

A performance test at 60 c.p.s. with an apparatus having the circuit characteristics hereinbefore described was made and the results are tabulated as follows for the individual wire sizes listed in column 1. All wires tested, except the ¾″ rod listed last, were insulated with the standard weatherproof insulation conventional in the art. In column 2 is listed the particular capacitor in the group 23a–23e which was placed in circuit with probe 9, while columns 3 and 4 are listings of meter 54 readings made on two different, successive days with voltages applied to the conductors of the magnitude listed in column 5. In every instance the instrument reading was accurate and unambiguous in indicating which of the five different voltage levels was being carried on the particular power line in test.

| 1 | 2 | 3 | 4 | 5 |
|---|---|---|---|---|
| Power Line Wire Size, A. W. G. No. | Capacitor Connected | Microammeter 54 Reading | | 60 Cycle Voltage Applied to Power Line |
| | | 1st day | 2d day | |
| 6 | 23a | 395 | 395 | 115 |
| 6 | 23b | 420 | 420 | 220 |
| 6 | 23c | 430 | 445 | 550 |
| 4 | 23a | 410 | 410 | 115 |
| 4 | 23b | 480 | 470 | 220 |
| 4 | 23c | 495 | 485 | 550 |
| 2 | 23a | 433 | 415 | 115 |
| 2 | 23b | 470 | 475 | 220 |
| 2 | 23c | 480 | 480 | 550 |
| 3/0 | 23a | 420 | 450 | 115 |
| 3/0 | 23b | 480 | 500 | 220 |
| 3/0 | 23c | 490 | 500 | 550 |
| 3/0 | 23d | 450 | -------- | 2,300 |
| 4/0 | 23a | 430 | 455 | 115 |
| 4/0 | 23b | 440 | 495 | 220 |
| 4/0 | 23c | 490 | 500 | 550 |
| 400,000 circular mils | 23a | 455 | 433 | 115 |
| 400,000 c.m | 23b | 500 | 480 | 220 |
| 400,000 c.m | 23c | 490 | 480 | 550 |
| ¾-inch rod, bare | 23e | 450 | -------- | 11,000 |

In considering the tabulated data it will be seen that the readings of meter 54 (columns 3 and 4) are, for every test, well within the range of 350–500 μa. hereinbefore mentioned. Moreover, the discrepancies in reading between different wire sizes with the same capacitor 23a–23e setting and the same impressed line voltage, and for the same lines on different days, are of such low order that there is no ambiguity in the measurements, particularly when the objective is to ascertain the general existing voltage status within one of five or six general categories, rather than exact determination. The only power line in the tabulation which was uninsulated was the ¾″ bare rod, to which was applied the highest potential of all, i.e., 11,000 volts. Again, the results were informative in terms of capacitor 23a–23e selection with the associated reading of microammeter 54. Where zero potential exists on the power line it will be understood that microammeter 54 will read zero at all settings of switch arm 21.

As hereinbefore mentioned, a circuit integrity checking auxiliary is highly desirable with instruments such as power line voltmeters, where a high reliability is imperative from the standpoint of personnel safety. A compact checking auxiliary is shown in FIG. 3 utilizing triode section 51b of double triode tube 51. With this arrangement the plate of triode section 51b is connected to the positive side of D.-C. source 40 through resistor 68 (resistance 27 kilohms), while the cathode is connected to ground 24 through bias resistor 69 (680 ohms) by-passed by capacitor 70 of 8 μfd. The output of triode section 51b is capacitor-coupled through capacitor 71 (0.05 μfd.), which is connected to both poles of double pole, single throw switch 72. Both switch arms of 72, together with the arm of single pole, single throw switch 73, are ganged together for simultaneous operation as indicated in broken line representation at 74. One contact of switch 72 is connected to insulated lead 15 which terminates in electrical connection with electrode 10, while the other contact completes the electrical circuit to the RC positive feedback ladder network including resistors 78 (22 kilohms), 79 (0.22 megohm) and 80 (2.2 megohms) across the pairs of which are connected, respectively, capacitor 81 (0.005 μfd.), and capacitor 82 (0.0005 μfd.), the complete network of which supplies a positive feedback through lead 85 in proper phase to grid 83 of triode section 51b, maintaining the operation of this triode section as an oscillator with an output frequency of 60 c.p.s. and an A.-C. potential measured at switch 72 of several volts magnitude. This latter potential is predetermined such that, when switch 72 is closed, there is applied to electrode 10 through lead 15, and consequently to point A, such a potential that the deflection of microammeter 54 will lie approximately midway in the 350–500 μa. working range hereinbefore mentioned. The selection of this voltage is effected by insertion of the appropriate value of load resistor 68 and/or bias resistor 69, as is known to persons skilled in the art. The oscillator circuit is of a standard design known in the art and described in "Radio Engineers Handbook" by F. E. Terman, McGraw-Hill Book Co., N.Y. (1943) pp. 505–6, and accordingly is not further detailed herein.

It will be noted that single pole, single throw switch 73 completes the circuit to the cathode heater 56 of double triode 51 and to the filament of electrometer tube 28 independently of testing switch 46 by connection to D.-C. source 44–45 through lead 84, which circuit is completed through the source connection to ground 24. Accordingly, when it is desired to obtain a circuit integrity check of the apparatus, the instrument is held away from any power lines and switch 73 is closed, which simultaneously closes both switch arms of 72. Under the circumstances, triode section 51b will commence operation as an oscillator, which will impress a characteristic potential on electrode 10. This potential will appear on switch arm 21 and on the grid 29 of electrometer tube 28, thus simulating the potential corresponding to an actual test conducted on a power line. Accordingly, if the oscillator, electrometer tube 28, and amplifier triode section 51a all operate properly, and if the power supplies are in good condition and all circuit connections are intact and connected properly, meter 54 will give a reading in the normal range of 350–500 μa., when switch 72 is closed, for all positions of switch arm 21, except for any loading of the oscillator by capacitors 23a–23e. For the circuit hereinbefore described in detail, the loading imposed by each of the capacitors in turn, except the largest, 23e (0.09 μf.), was so small that the reading of meter 54 fell within the required range when the apparatus was in good operating order. When switch arm 21 was closed on the switch contact in circuit with 23e, the current reading of meter 54 dropped below the 350 μa. level, and this can be viewed as a type of negative check on operation. Therefore in the circuit hereinbefore detailed, a microammeter scale reading of about 350–500 microamperes constituted complete assurance that the apparatus was operating satisfactorily.

Following the circuit integrity test, the operator opens switch 73 (together with switch 72 ganged therewith) and is then ready for the measurement of power line voltages, which is carried out by closure of switch 46 prior to contacting a power line with probe 9.

In the interests of further portability and ruggedness, certain component substitutions can be made in the circuit of this invention. Thus, an appropriate transistor can replace thermionic triode amplifier-rectifier 51a with equal effectiveness in providing a D.-C. signal and in raising the power level of the output of electrometer 28 to a point sufficient for operation of conventional current meters. Or, if desired, an oscilloscope can be substituted for D.-C. meter 54 in the output circuit of electrometer tube 28, although this latter substitution reduces portability somewhat and the apparatus thus modified is more suitable for use in the laboratory than in the field.

Also, the oscillator auxiliary employed for circuit integrity checking can be replaced by a transistor-type oscillator. Or chopper-type oscillators, such as those used in automobile radio power supplies, can be utilized as the generator of the signal for circuit integrity checking, with or without conjoint use as a B+ supply for the thermionic components of the circuit. Moreover, a transistor-type power supply consisting of a light weight oscillator, step-up transformer, rectifier and filter powered by low voltage sources 44 and 45 can be substituted for the high voltage B battery described.

Apart from its use as a voltmeter, the apparatus of this invention can further be used to ascertain and plot electric field strengths in regions near power lines or other electrical equipment, it being only necessary for this enlarged use to calibrate the apparatus by taking measurements in known fields and allocating particular capacitors 23a–23e for predetermined field strength levels. Or, less preferably, a single capacitor version of the apparatus may be used in conjunction with a wide range current meter in the same manner as hereinbefore described for the voltmeter.

It will be understood that this invention may be modified in numerous respects within the skill of the art and, accordingly, it is intended to be limited only by the scope of the appended claims.

What is claimed is:

1. A capacitive A.-C. power line voltmeter for use in the frequency range of about 25-1000 c.p.s. comprising in combination an electrically insulated probe provided with an electrically insulated metallic electrode having a V-notch sufficiently large to constitute a seat for the abutment thereagainst of the power line the voltage of which it is desired to evaluate, a lead in electrical connection with said electrode and with one terminal of a capacitor, the other terminal of said capacitor being connected to electrical ground, a high impedance voltage detector in shunt connection with respect to said capacitor to electrical ground, and means in electrical circuit with the output of said voltage detector for measuring the potential existing in said power line as a funciton of the output of said voltage detector.

2. A capacitive A.-C. power line voltmeter for use in the frequency range of about 25–1000 c.p.s. comprising in combination an electrically insulated probe provided with an electrically insulated metallic electrode having a V-notch sufficiently large to constitute a seat for the abutment thereagainst of the power line the voltage of which it is desired to evaluate, a lead in electrical connection with said electrode and with the arm of a switch provided with a plurality of contacts, individual capacitors having different predetermined values of capacitance connected in series electrical circuit between individual ones of said contacts and electrical ground, a high impedance voltage detector in shunt connection with respect to said capacitors from said arm of said switch to electrical ground, and means in electrical circuit with the output of said voltage detector for measuring the potential existing in said power line as a function of the output of said voltage detector.

3. A capacitive A.-C. power line voltmeter according to claim 2 provided with auxiliary means for checking the integrity of the electrical measurement circuit of said voltmeter.

4. A capacitive A.-C. power line voltmeter according to claim 2 wherein said V-notch in said metallic electrode is of substantially 90° included angle covered with a substantially uniform thickness of electrical insulation of breakdown characteristic sufficient to withstand with safety the voltage applied to said power line.

5. A capacitive A.-C. power line voltmeter for use in the frequency range of about 25–1000 c.p.s. comprising in combination an electrically insulated probe provided with an electrically insulated metallic electrode having a V-notch sufficiently large to constitute a seat for the abutment thereagainst of the power line the voltage of which it is desired to evaluate, a lead in electrical connection with said electrode and with the arm of a switch provided with a plurality of contacts, individual capacitors having different predetermined values of capacitance connected in series electrical circuit between individual ones of said contacts and electrical ground, a high impedance voltage detector consisting of an electrometer tube provided with a D.-C. power source, said electrometer tube being connected with grid element in electrical circuit with said lead at a point between said electrode and said arm of said switch and with plate and cathode elements respectively, connected to the positive terminal of said D.-C. source and electrical ground, a triode vacuum tube section with control grid capacitor-coupled to the plate of said electrometer tube, the plate of said triode section being connected to the positive terminal of said D.-C. power source and the cathode of said triode section being connected to a potential source biasing said grid element of said triode section to substantially cut-off and thence to electrical ground, and a current meter connected in series electrical circuit between said cathode of said triode section and said potential source.

6. A capacitive A.-C. power line voltmeter according to claim 5 provided with auxiliary means for checking the integrity of the electrical measurement circuit of said voltmeter comprising a second triode section operating as an oscillator and connected in electrical circuit at the plate with said D.-C. power source and at the cathode with electrical ground, a second lead in electrical connection with said electrically insulated metallic electrode connected through a first pole of a second switch and a coupling capacitor to said plate of said second triode section, an R-C positive feedback ladder network connected through a second pole of said second switch between said coupling capacitor and the control grid of said second triode section, and a third switch ganged for common operation with said second switch so as to complete the filament power circuits for said electrometer tube and both of said triode sections.

References Cited in the file of this patent

UNITED STATES PATENTS

| | | |
|---|---|---|
| 1,745,419 | Henneberger | Feb. 4, 1930 |
| 1,786,666 | Lohaus | Dec. 30, 1930 |
| 2,199,757 | Rohde | May 7, 1940 |
| 2,255,502 | Bousman | Sept. 9, 1941 |
| 2,322,708 | Burger | June 22, 1943 |
| 2,412,191 | Zottu | Dec. 3, 1946 |
| 2,468,125 | Silver | Apr. 26, 1949 |
| 2,874,354 | Bell | Feb. 17, 1959 |